Jan. 13, 1970  G. FAUTH  3,489,070
DOUBLE EXPOSURE PREVENTING STRUCTURE FOR PHOTOGRAPHIC CAMERAS
Filed Aug 24, 1967
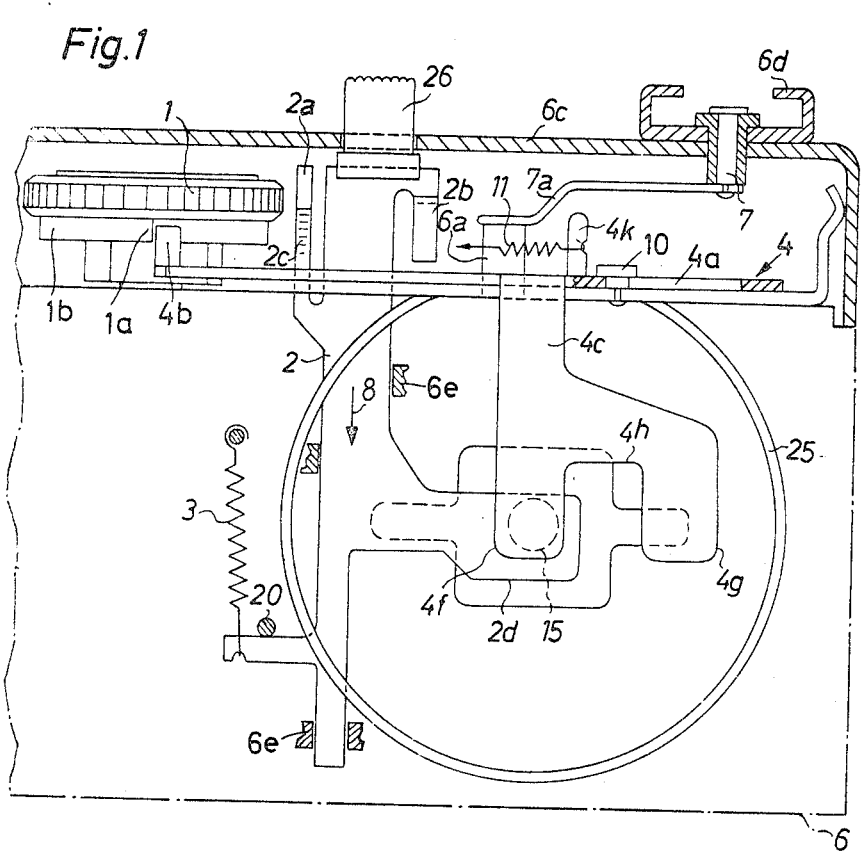
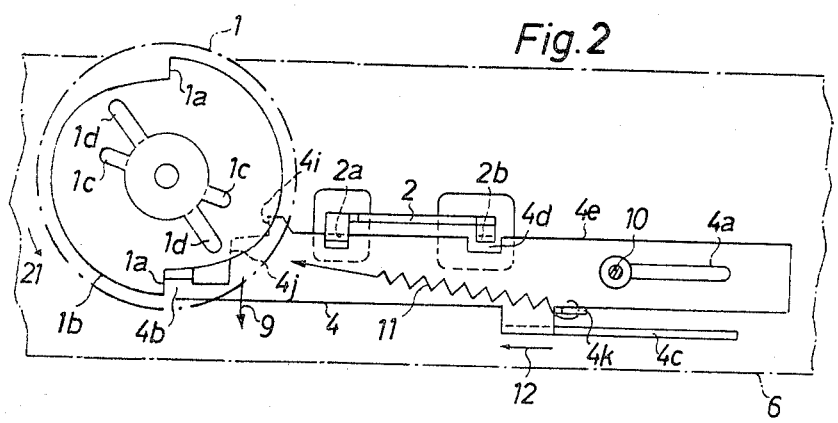
INVENTOR.
GÜNTER FAUTH

United States Patent Office 3,489,070
Patented Jan. 13, 1970

3,489,070
DOUBLE EXPOSURE PREVENTING STRUCTURE FOR PHOTOGRAPHIC CAMERAS
Günter Fauth, Unterhaching, Germany, assignor to Agfa-Gevaert Aktiengesellschaft, Leverkusen, Germany
Filed Aug. 24, 1967, Ser. No. 663,146
Claims priority, application Germany, Aug. 27, 1966, A 53,358
Int. Cl. G03b 19/04, 9/16
U.S. Cl. 95—31                                18 Claims

ABSTRACT OF THE DISCLOSURE

A reciprocable blocking member which prevents operation of the shutter release when in uncocked position and which prevents operation of the film transporting mechanism when in cocked position carries a shutter blade which can admit light to the exposure aperture of a photographic camera when the shutter release is operated so that the blocking member can move to uncocked position. A spring biases the blocking member to uncocked position and the film transporting mechanism automatically cocks the blocking member in response to transport of film by the length of a frame. The blocking member completes the flash circuit during movement from cocked toward uncocked position and the shutter release comprises a second blade which covers the aperture when the shutter release is idle so that no light can reach the film while the blocking member is being cocked by the film transporting mechanism.

BACKGROUND OF THE INVENTION

The present invention relates to photographic cameras in general, and more particularly to improvements in cameras which are provided with means for preventing double exposure.

It is already known to provide a photographic camera with a blocking member in the form of a slide or lever which prevents the user from making an exposure prior to transport of the film by the length of a frame. A serious drawback of such cameras is that the blocking member does not perform any other function, i.e., that it occupies room in addition to that which is needed to accommodate the shutter proper, the shutter release, the film transporting mechanism, the objective mount and other essential or optional components.

SUMMARY OF THE INVENTION

It is an important object of the present invention to provide a photographic camera with a very simple, rugged, compact and reliable blocking device which prevents double exposure of film frames and which also performs one or more additional important functions with attendant savings in space, assembly work and material.

Another object of the invention is to provide a blocking device of the just outlined character which can perform the function of an essential component of the camera in addition to prevention of double exposures.

A further object of the invention is to provide a blocking device which can prevent operation of the shutter release when the operator has failed to advance the film subsequent to completion of an exposure and which also prevents transportation of film when the exposure aperture in registry with an unexposed film frame.

An additional object of the invention is to provide a blocking device of the above outlined type which can automatically complete the flash circuit at the exact moment when light furnished by a built-in or detachable flash unit can reach the unexposed film frame.

Another important object of the invention is to provide a double exposure preventing or blocking device which can also perform the function of a shutter.

The camera of my invention comprises essentially a housing with an exposure aperture through which light coming from a scene or subject can reach an unexposed film frame, film transporting means mounted in the housing and operative to advance the film lengthwise to place successive unexposed film frames into registry with the exposure aperture, a shutter release movable with reference to the housing by hand or by remote control between a normal idle position and a shutter releasing position, blocking means for blocking the operation of film transporting means prior to movement of shutter release to releasing position and for blocking the movement of shutter release to releasing position prior to movement of the blocking means, under the action of film transporting means, from an uncocked to a cocked position, shutter blade means preferably forming an integral part of the blocking means and movable therewith between cocked and uncocked positions to cover the aperture in each such position but to uncover the aperture during movement of the blocking means from cocked to uncocked position, and means for permanently biasing the blocking means to uncocked position. The shutter release is provided with means to prevent admission of light to the exposure aperture when the shutter release is idle and while the film transporting means effects return movement of blocking means to cocked position in response to advance of film by the length of a frame. When in idle position, the shutter release holds the blocking means against the action of the biasing means. The exposure is made in automatic response to operation of the shutter release for movement from idle to releasing position but only when the film transporting means has placed an unexposed film frame into registry with the aperture.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary front elevational view of a still camera which embodies the present invention, certain parts of the camera being shown in longitudinal vertical sectional view; and FIG. 2 is a schematic top plan view of the structure shown in FIG. 1, with the top portion of the camera housing removed.

DESCRIPTION OF THE PREFERRED EMBODIMENTS

The drawing shows a still camera having a housing or body 6 which includes a top portion or cap 6c supporting an accessory shoe 6d with a central contact 7. This contact is engaged by a complementary contact of a flash unit whose foot is insertable into the shoe 6d. The front wall of the housing 6 carries an objective mount 25 and the housing defines an exposure aperture 15 which can admit light to an unexposed frame of the film, not shown. The shutter release includes a manually depressible pushbutton 26 and a vertically reciprocable carriage 2 which is guided in bearings 6e and is biased to a starting or idle position in which it abuts against a fixed stop 20. The means for biasing the carriage 2 to such starting position (which is shown in the drawing) comprises a helical return spring 3. The direction in which the push-button 26 must be depressed in order to move the shutter release to releasing position in which the camera can make an exposure is indicated by the arrow 8. The carriage 2 comprises two projections 2a, 2b the former of which is provided with an inclined cam surface 2c. This carriage further comprises a vertically reciprocable shutter blade 2d which overlies the aperture 15 when the shutter release is in the idle position which is shown in the drawing. The mechanism for transporting the film comprises a manually operable wheel 1 a portion of which extends from the top portion 6c of the housing 6 and which carries a disk-shaped motion transmitting cam 1b provided with two peripheral projections or teeth 1a which are located diametrically opposite each other. The wheel 1 is further provided with two additional pairs of motion transmitting projections or ribs 1c, 1d. The ribs 1d are longer than the ribs 1c, and the ribs of each pair are located diametrically opposite each other. The cam 1b cooperates with a horizontally reciprocable double exposure preventing member 4 (hereinafter called blocking member for short) which is installed in the space enclosed by the top portion 6c and is turnable about the axis of a fixed pivot pin 10. This pin is received in an elongated slot 4a of the blocking member 4 so that the latter is also free to move lengthwise between a cocked position and an uncocked position in each of which the pin 10 abuts against the surface at the one or the other end of the slot 4a. The blocking member 4 is biased to uncocked position by a helical spring 11 which operates between the housing 6 and a retainer 4k of the blocking member.

The blocking member 4 is provided with a shutter blade 4c which extends through a slot in the housing 6 and comprises two portions or flaps 4f, 4g each of which can close the aperture 15. A cutout or opening 4h separates the flaps 4f, 4g from each other. The central contact 7 carries a resilient contact blade 7a which normally bears against an insulating post 6a in the housing 6. The rear edge 4e of the blocking member 4 has a cutout or notch 4d for the projection 2b of the carriage 2 and the blocking member is further provided with three followers 4i, 4j, 4b which respectively cooperate with the lugs 1c, 1d and teeth 1a.

The blocking member 4 is peferably made of sheet metal and has a first portion (including the followers 4b, 4i, 4j and the retainer 4k) and a second portion (blade 4c) which is normal to the plane of the first portion.

In the position which is illustrated in the drawing, the portion or flap 4f of the blade 4c overlies the aperture 15 and the follower 4b extends into the path of one of the projections or teeth 1a so that the film transporting wheel 1 cannot be turned in the counterclockwise direction (arrow 21) in order to transport the film by the length of a frame. Thus, in its illustrated cocked position, the blocking member 4 is effective to prevent double exposure, it being assumed that the aperture 15 registers with an unexposed film frame. The shutter release 2, 26 is idle, i.e., the carriage 2 bears against the fixed stop 20 and its blade 2d overlies the aperture 15.

If the user of the camera wishes to make an exposure, he depresses the pushbutton 26 (arrow 8) whereby the projection 2b of the carriage 2 enters the notch 4d in the rear edge 4e of the blocking member 4. At the same time, the cam surface 2c of the projection 2a slides along the rear edge 4e and causes the blocking member 4 to turn on the fixed pivot pin 10 in the direction indicated by arrow 9. As the carriage 2 continues to move downwardly and away from the stop 20 against the opposition of the return spring 3, its blade 2a exposes the aperture 15 but entry of light through this aperture is still blocked by the portion or flap 4f of the shutter blade 4c. During such downward movement of the carriage 2 and its projection 2a toward releasing position, the cam surface 2c turns the blocking member 4 sufficiently to disengage the follower 4b from the adjoining projection or tooth 1a. Such disengagement takes place when the angular displacement of the blocking member 4 in the direction indicated by arrow 9 has sufficed to move the notch 4d of the rear edge 4e away from registry with the projection 2b, i.e., the spring 11 is then free to propel the blocking member 4 toward uncocked position in the direction indicated by arrow 12 whereby the flap 4f moves away from the aperture 15 and the latter admits light to the unexposed film frame. The exposure is completed when the opening 4h moves beyond the aperture 15 because the flap 4g then prevents further admission of light in the uncocked position of the blocking member 4. Thus, the bias of the spring 11 will determine the exposure time. When the spring 11 is free to contract and to thus advance the blocking member 4 and its blade 4c in the direction indicated by arrow 12, the rear edge 4e of the blocking member slides along the cam surface 2c of the projection 2a. During such movement of the blocking member 4 toward uncocked position, its spring retainer 4k engages the contact blade 7 and lifts the latter off the insulating post 6a. This completes the flash circuit so that, if utilized, the flash unit can illuminate the subject at the time when the opening 4h registers with the aperture 15, i.e., when the artificial light can reach the film behind the aperture 15. The manner in which the blocking member 4 is connected to one pole of a battery or the like to complete the flash circuit when its spring retainer 4k engages the contact blade 7 is not shown in the drawing. This spring retainer 4k acts not unlike a trip.

If the pushbutton 26 is thereupon released, the spring 3 contracts and returns the carriage 2 into abutment with the fixed stop 20. This moves the blade 2d back into registry with the aperture 15 so that the latter is covered by the blade 2d as well as by the flap 4g of the shutter blade 4c. Such return movement of the carriage 2 to idle position enables the spring 11 to turn the blocking member 4 about the pivot pin 10 because the rear edge 4e bears against the cam surface 2c of the projection 2a which travels upwardly under the bias of the return spring 3. However, such pivotal movement of the blocking member 4 is terminated when its follower 4b strikes against the peripheral surface of the cam 1b to the left of the lower projection or tooth 1a, as viewed in FIG. 2. The film transporting wheel 1 is combined with a one-way clutch (not shown) which prevents its rotation in a clockwise direction (counter to that indicated by the arrow 21). Such one-way clutch may comprise a conventional ratchet-and-pawl assembly.

If the operator thereupon attempts to depress the pushbutton 26 prior to turning of the wheel 1 in the direction indicated by arrow 21, the projection 2b strikes against the blocking member 4 which prevents further movement of the carriage 2 in the direction indicated by arrow 8. This is due to the fact, that, when the follower 4b of the blocking member 4 bears against the periphery of the cam 1b and does not engage with the radial face of a tooth 1a, the notch 4d of the rear edge 4e is out of registry with the projection 2b. Thus, and in order to make an exposure, the operator must turn the wheel 1 in the direction indicated by arrow 21. Such turning causes the ribs 1c, 1d to respectively engage and displace the followers 4i, 4j of the blocking member 4 whereby the latter moves in a direction to the right, as viewed in FIG. 2 and causes the spring 11 to store energy. Finally, the follower 4b is engaged by the tooth 1a of the cam 1b at a time when the notch 4d returns into registry with the projection 2b, i.e., when the wheel 1 has completed the advance of film by the length of a frame. The operator feels that the wheel 1 cannot be turned any longer because the blocking member 4 returns to the cocked position shown in FIG. 2 in which the surface bounding the left-hand end of its slot 4a bears against the stem of the pivot pin 10.

During biasing of the spring 11, the blade 4c travels back to the position shown in FIG. 1 whereby the opening 4h travels in front of the aperture 15 but the latter cannot admit light to the unexposed film frame because it is covered by the blade 2d of the carriage 2 which latter already dwells in the idle position, i.e., it is held in abutment with the stop 20. The camera is now ready to make a fresh exposure in response to depression of the pushbutton 26. The wheel 1 is blocked by the member 4 until after completion of the exposure. The projection 2b extends into the notch 4d and holds the blocking member 4 is cocked position until the operator decides to depress the pushbutton 26.

A very important advantage of the improved camera is that the shutter need not be provided with any additional parts. This is due to the fact that one of the shutter blades (2d) is provided on or as an integral part of the shutter release (carriage 2) and that the other shutter blade (4c) is provided on or as an integral part of the double exposure preventing or blocking member 4. As stated before, the blocking member 4 may be made of sheet metal and its blade 4c may be formed by bending a portion of an originally flat blank.

My camera is susceptible of many additional modifications without departing from the spirit of the present invention. For example, the wheel 1 can be replaced by a film transporting lever or by any other suitable film transporting device which can operate the motion transmitting cam 1b in response to transport of film by the length of a frame through the intermediary of a one-way clutch or the like. Furthermore, the blocking member 4 can be combined with a suitable delay or retard mechanism which is adjustable to furnish a range of exposure times. In other words, such retard mechanism can oppose the bias of the spring 11 for a desired period of time to determine the length of the interval required to move the flap 4g of the blade 4c into registry with the aperture 15. The blocking member 4 is then provided with an actuating projection which engages the retard mechanism when the slot 4a slides with reference to the pivot pin 10 to thereby control the length of interval during which the opening 4h registers with the aperture 15 to admit light to that film frame which is located behind the aperture.

The circuit of the flash unit can be completed in a number of ways. For example, the blocking member 4 could be provided with two trips one of which would close and the other of which would open the flash circuit in response to lengthwise movement of the blocking member under the bias of the spring 11. Moreover, the flash circuit could comprise two series-connected switches both of which would close only when the opening 4h registers with the aperture 15 and one of which would open automatically in all other positions of the blocking member. Still further, the camera may be provided with a bulb position to maintain the aperture 15 exposed for any desired interval of time.

Finally, it is equally possible to replace the projection 2a of the shutter release carriage 2 with a projection having a cam surface which can effect movements of the blocking member 4 in and counter to the direction indicated by the arrow 8, i.e., at right angles to the direction of movement under the action of the cam surface 2c shown in FIGS. 1 and 2. This would result in tilting of the blocking member 4 on the pivot pin 10. Such construction is often preferable because the movements of the blocking member 4 and its blade 4c are gradual rather than intermittent.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a photographic camera, a combination comprising a housing; an exposure aperture in said housing; film transporting means mounted in said housing and operative to advance the film lengthwise; a shutter release mounted in said housing and movable between idle and releasing positions; blocking means mounted in said housing for blocking operation of said film transporting means prior to movement of said shutter release to releasing position, said blocking means being movable between cocked and uncocked positions; shutter blade means rigid with said blocking means and arranged to cover said aperture in cocked position and to expose said aperture to scene light during movement of blocking means toward uncocked position; and motion transmitting means for moving said blocking means to cocked position.

2. A combination as defined in claim 1, wherein said blade means comprises first and second portions which respectively cover said aperture in the cocked and uncocked positions of said blocking means.

3. A combination as defined in claim 2, wherein said portions of said blade means define between themselves an opening which registers with said aperture when said blocking means moves from cocked to uncocked position.

4. A combination as defined in claim 2, further comprising second blade means movable with said shutter release to cover said aperture in the idle position of said shutter release and during movement of said blocking means from uncocked to cocked position.

5. A combination as defined in claim 1, further comprising means for biasing said blocking means to uncocked position.

6. A combination as defined in claim 5, wherein said biasing means comprises resilient means urging said blocking means against said motion transmitting means.

7. A combination as defined in claim 6, wherein said resilient means is arranged to bias said blocking means against said shutter release.

8. A combination as defined in claim 1, wherein said blocking means comprises a notch and said shutter release comprises a projection extending into said notch in response to completed transport of film by the length of a frame whereby said shutter release is free to move from idle to releasing position but holds said blocking means in cocked position.

9. A combination as defined in claim 1, further comprising a normally open flash circuit, said blocking means comprising means for completing said circuit in response to movement from cocked toward uncocked position.

10. A combination as defined in claim 1, wherein said motion transmitting means is arranged to move said blocking means to cocked position in response to operation of said film transporting means.

11. A combination as defined in claim 10, wherein said motion transmitting means comprises rotary cam means connected with said film transporting means and having projections arranged to move said blocking means to cocked position in response to rotation by said film transporting means.

12. A combination as defined in claim 11, wherein said cam means is a disk cam and said projections include teeth and ribs provided on said disk cam.

13. A combination as defined in claim 1, wherein said shutter release is held by said blocking means against movement to releasing position in the uncocked position of said blocking means.

14. In a photographic camera, a combination comprising a housing; an exposure aperture in said housing; film transporting means mounted in said housing and operative to advance the film lengthwise; a shutter release mounted in said housing and movable between idle and releasing positions; blocking means mounted in said housing for blocking the operation of said film transporting means prior to movement of said shutter release to releasing position, said blocking means being movable between cocked and uncocked positions; shutter blade means forming an integral part of said blocking means and arranged to cover said aperture in cocked position and to expose said aperture to scene light during movement of blocking means toward uncocked position; and motion transmitting means for moving said blocking means to cocked position.

15. A combination as defined in claim 14, wherein said blocking means consists of metallic sheet stock and comprises a first portion located in a first plane and cooperating with said film transporting means and said shutter release and a second portion located in a second plane which intersects said first plane, said second portion constituting said blade means.

16. In a photographic camera, a combination comprising a housing; an exposure aperture in said housing; film transporting means mounted in said housing and operative to advance the film lengthwise; a shutter release mounted in said housing and movable between idle and releasing positions; blocking means mounted in said housing for blocking the operation of said film transporting means prior to movement of said shutter release to releasing position, said blocking means being movable between cocked and uncocked positions; shutter blade means movable with said blocking means and arranged to cover said aperture is cocked position and to expose said aperture to scene light during movement of blocking means toward uncocked position, said blade means comprising first and second portions which respectively cover said aperture in the cocked and uncocked positions of said blocking means; second blade means forming an integral part of said shutter release and movable therewith to cover said aperture in the idle position of said shutter release and during movement of said blocking means from uncocked to cocked position; and motion transmitting means for moving said blocking means to cocked position.

17. In a photographic camera, a combination comprising a housing; an exposure aperture in said housing; film transporting means mounted in said housing and operative to advance the film lengthwise; a shutter release mounted in said housing and movable between idle and releasing positions; blocking means mounted in said housing for blocking the operation of said film transporting means prior to movement of said shutter release to releasing position, said blocking means being movable between cocked and uncocked positions and having a notch; motion transmitting means for moving said blocking means to cocked position, said shutter release comprising a projection extending into said notch in response to completed transport of film by the length of a frame whereby said shutter release is free to move from idle to releasing position but holds said blocking means in cocked position, said shutter release further comprising a cam surface arranged to move said blocking means from engagement with said motion transmitting means and to move said notch away from said projection in response to movement of said shutter release from idle to releasing postion and when said blocking means is cocked; means for permanently biasing said blocking means to uncocked position; and shutter release from idle to releasing position and when arranged to cover said aperture in cocked position and to expose said aperture to scene light during movement of said blocking means toward uncocked position.

18. In a photographic camera, a combination comprising a housing; an exposure aperture in said housing; film transporting means mounted in said housing and operative to advance the film lengthwise; a shutter release mounted in said housing and movable between idle and releasing positions; a normally open flash circuit; blocking means mounted in said housing for blocking the operation of said film transporting means prior to movement of said shutter release to releasing position, said blocking means being movable between cocked and uncocked positions and comprising means for completing said circuit in response to movement from cocked toward uncocked position, said circuit completing means comprising a spring retainer on said blocking means; shutter blade means movable with said blocking means and arranged to cover said aperture in cocked position and to expose said aperture to scene light during movement of blocking means toward uncocked position; motion transmitting means for moving said blocking means to cocked position; and spring means operating between said retainer and said housing to permanently bias said blocking means to uncocked position.

References Cited

UNITED STATES PATENTS

| | | | |
|---|---|---|---|
| 2,143,776 | 1/1939 | Hickman | 95—53 |
| 2,722,872 | 11/1955 | Schrader | 95—31 |
| 2,940,374 | 6/1960 | Fuerst | 95—60 |
| 3,232,196 | 2/1966 | Sapp et al. | 95—31 |
| 3,237,542 | 3/1966 | Ataka | 95—31 |
| 3,353,467 | 11/1967 | Ernisse et al. | 95—11.5 |

NORTON ANSHER, Primary Examiner

D. S. STALLARD, Assistant Examiner

U.S. Cl. X.R.

95—55